Patented Apr. 28, 1936

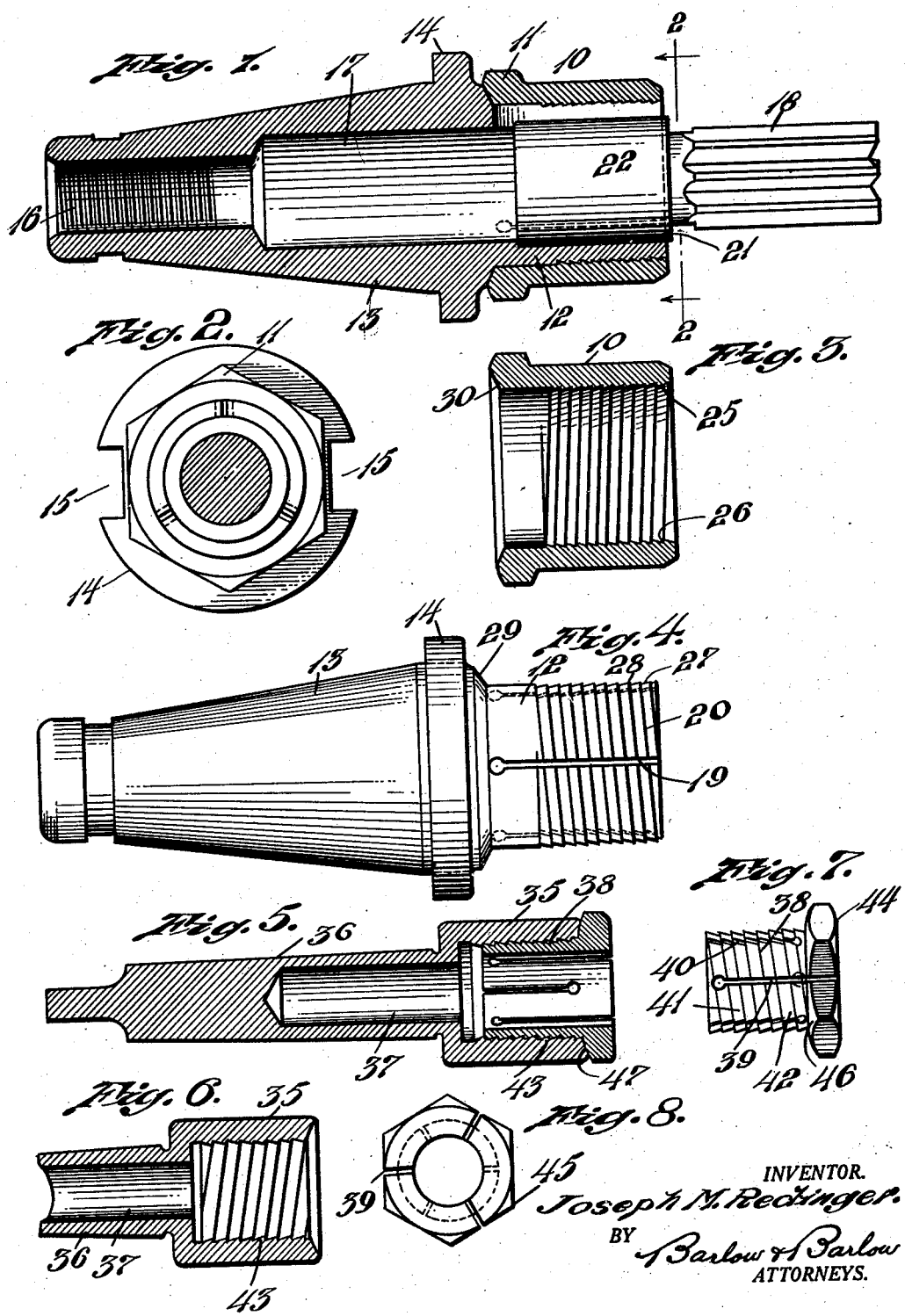

2,038,602

UNITED STATES PATENT OFFICE 2,038,602

CHUCK

Joseph M. Redinger, Johnston, R. I.

Application December 18, 1935, Serial No. 55,084

3 Claims. (Cl. 279—32)

This invention relates to a chuck and is a continuation in part of my co-pending application which has matured into Patent No. 2,025,308, dated December 24, 1935; and has for one of its objects the provision of an arrangement by which some separable part may be secured in the chuck so as to be substantially one as one solid piece therewith for operative purposes.

Another object of the invention is the provision of tapered surfaces on the relatively movable members of the chuck which when the members are moved in one direction will cause the tapered surfaces to bind and move portions of one of the members into engagement with the detachable tool or other part to firmly engage the same.

Another object of the invention is the arrangement of the tapers in a staggered relation and in the formation of a helix or thread so that this arrangement may be utilized for moving the parts to their desired position.

Another object of the invention is the provision of a holding means by which the gripped part or tool will be centralized so as to rotate within half a thousandth of a true center and thus a chuck by which precision and accuracy may be readily attained.

With these and other objects in view, the invention consists of certain novel features of construction, as will be more fully described, and particularly pointed out in the appended claims.

In the accompanying drawing:

Fig. 1 is a sectional view showing the chuck on the end of a shank for mounting the same in a machine and a tool held within the chuck;

Fig. 2 is a sectional view on line 2—2 of Fig. 1;

Fig. 3 is a sectional view of the cylindrical or collar member alone;

Fig. 4 is an elevation of the sleeve member attached to the shank for mounting the same in the machine;

Fig. 5 is a sectional view of a modified form of chuck;

Fig. 6 is a sectional view of the collar or cylindrical portion with a portion of its shank extending therefrom;

Fig. 7 is a side elevation of the contractible sleeve member of the structure shown in Fig. 5;

Fig. 8 is an end view of the sleeve shown in Fig. 7.

In the use of machine tools the cutting implements frequently require change either for different sizes, sharpening or the like, and some sort of detachable means must be provided for this purpose. It may occur that parts become loose or the arrangement may be such that the parts are separated and attached with some difficulty; and in order to simplify this operation and yet provide very secure and rigid holding of the detachable part, I have provided a chuck in which a tool may be secured very solidly for all practical purposes, for which purpose I utilize a long taper which I have arranged in helical form; and I have provided a portion of a conical surface and a similar recessed surface for engagement by which an effective centralizing abutment is provided for causing the tapered surfaces to move one along the other to effect a contraction of one of the parts and a very effective secure, and for all practical purposes, a solid structure of the detachable parts; and the following is a more detailed description of the present embodiment of this invention, illustrating the preferred means by which these advantageous results may be accomplished:

With reference to the drawing, I have shown two modifications each consisting of a cylindrical rigid collar and an inner split contractible sleeve. In one modification the shank for mounting these parts in a machine is attached to the contractible sleeve, while in the other modification the shank is attached to the outer cylindrical collar. In Figure 1 this collar is designated 10 and is preferably provided with a hexagonal flange 11 at one end which may be gripped by a wrench or the like for rotation relative to the contractible sleeve 12 which is carried by the shank 13 either by being suitably attached thereto or integral therewith, as shown in the illustration herein. This shank is provided with an annular flange 14 which is recessed as at 15 for the reception of a spanner wrench or other suitable holding means so that it may be held while a wrench or the like engages the hexagonal flange 11 for relatively rotating the collar. This shank is provided with a suitable threaded bore 16 for mounting the same in a machine, and is also provided with a bore 17 for the reception of the end of some tool such as 18 which it may be desired to insert within the chuck.

The sleeve 12 is longitudinally slotted as at 19 so as to provide a plurality of separate portions 20 which may be sprung inwardly so that its inner surface 21 may be caused to grip either the surface directly of a tool such as 18 or the surface of an adaptor 22 which may encircle or embrace the tool and itself fit within the sleeve.

The interengaging surfaces between the member 10 and the sleeve 12 are both helical as is the common thread, so that upon relative rotation there is an axial advancement of the parts in one direction or the other, depending upon the direction of rotation. However, the interengaging surfaces differ from the usual thread in that one surface is provided with a relatively long taper 25 as shown in the member 10, while the other surface 26 is relatively abrupt or at substantially a right angle to the axis of the member. Similarly, there is a long taper on the outer surface 27 of the helically arranged interengaging surface of the member 12 with its abrupt surface 28 corresponding to the surfaces 25 and 26 of the collar member 10.

A tapered abutment 29 is provided at or adjacent the end of the sleeve 12 which conforms to a portion of a cone and a similarly tapered recessed portion 30 is provided at the end of the collar 10 so that as this collar member is moved by its rotation axially into engagement with this tapered surface 29 and the abutment surfaces 29 and 30 engage, the collar member will be accurately centralized, and as further axial movement is arrested in this centralized relation the tapered surface 25 will start to move along the tapered surface 27, thereby exerting a pressure inwardly on the surface 27 along the extended length of the taper throughout the entire surface thereof and will force inwardly the sections 20 between the slots 19 and cause them to grip a closely fitting tool or other part within the sleeve 12, whereby the tool not only is securely gripped, but by reason of the centralizing taper at the end of both the sleeve and the collar the movement inwardly is in such an accurate relation that it is found that a gripped tool or part will operate within plus or minus one-half a thousandth of an inch.

It is of course understood that the lesser the angle the easier it is mechanically to tighten up the clamping parts, while the steeper the angle the quicker such tightening may be accomplished, although greater force must be applied. I, however, have chosen an angle of approximately five degrees which is such an angle as will remain firmly in tightened position after set up and yet will enable the parts to be loosened when desired.

The same principle of operation as above described applies to the chuck which I have shown in Figures 5 to 8, inclusive. Here the collar or cylindrical member 35 is provided with a shank 36 integral therewith which is of a shape to fit into some machine different from that shown in the shank in Fig. 1. A bore 37 is provided for the reception of the end of a tool and a sleeve 38 slotted as at 39 and 40 to provide contractible parts 41 between the slots is provided with a similar helical taper 42, as above described, for fitting within the helical taper 43 in the collar 35. A hexagonal flange 44 is provided on the sleeve for rotating the same with reference to the cylindrical collar 35. The undersurface of this flange 46 is formed on a taper along the surface of a cone to fit the similar surface 47 formed at the end of the collar so that relative rotation of the sleeve and the collar will cause the centralizing of the parts and then the contraction of the sections to grip a tool which may be inserted within the chuck.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A chuck or the like for a tool comprising a cylindrical member and a longitudinally split sleeve fitting within said member, helical interfitting serrations between said member and sleeve, said serrations presenting a long tapered surface inclined toward the axis of the socket in a direction outwardly thereof and also presenting a surface generally perpendicular to the axis along an edge thereof, the mouth of said member having an outwardly flaring edge and said sleeve having a cooperating tapered surface conforming to the section of a cone and of a diameter larger than said serrations to engage said flaring edge and perfectly centralize said sleeve and member and at the same time serve as an abutment to limit the axial movement of said sleeve in said member and cause the long tapered surfaces to act and compress said sleeve.

2. A chuck or the like for a tool comprising a cylindrical member and a longitudinally split sleeve fitting within said member, helical interfitting serrations between said member and sleeve, said serrations presenting a long tapered surface inclined toward the axis of the socket in a direction outwardly thereof and also presenting a surface generally perpendicular to the axis along an edge thereof, the mouth of said member having an outwardly flaring edge and said sleeve having a cooperating tapered surface conforming to the section of a cone and of a diameter larger than said serrations to engage said flaring edge and perfectly centralize said sleeve and member and at the same time serve as an abutment to limit the axial movement of said sleeve in said member and cause the long tapered surfaces to act and compress said sleeve, and a shank on said sleeve for mounting the same in a machine.

3. A chuck or the like for a tool comprising a cylindrical member and a longitudinally split sleeve fitting within said member, helical interfitting serrations between said member and sleeve, said serrations presenting a long tapered surface inclined toward the axis of the socket in a direction outwardly thereof and also presenting a surface generally perpendicular to the axis along an edge thereof, the mount of said member having an outwardly flaring edge and said sleeve having a cooperating tapered surface conforming to the section of a cone and of a diameter larger than said serrations to engage said flaring edge and perfectly centralize said sleeve and member and at the same time serve as an abutment to limit the axial movement of said sleeve in said member and cause the long tapered surfaces to act and compress said sleeve, and a shank on said member for mounting the same in a machine.

JOSEPH M. REDINGER.